(12) United States Patent
Ogawa et al.

(10) Patent No.: US 11,416,237 B2
(45) Date of Patent: Aug. 16, 2022

(54) CONTROL APPARATUS, CONTROL METHOD, AND COMPUTER PROGRAM

(71) Applicant: SUMITOMO ELECTRIC INDUSTRIES, LTD., Osaka (JP)

(72) Inventors: Akihiro Ogawa, Osaka (JP); Tatsuya Izumi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 313 days.

(21) Appl. No.: 16/628,176

(22) PCT Filed: May 28, 2018

(86) PCT No.: PCT/JP2018/020274
§ 371 (c)(1),
(2) Date: Jan. 2, 2020

(87) PCT Pub. No.: WO2019/035260
PCT Pub. Date: Feb. 21, 2019

(65) Prior Publication Data
US 2020/0301695 A1   Sep. 24, 2020

(30) Foreign Application Priority Data
Aug. 16, 2017 (JP) .............................. JP2017-157194

(51) Int. Cl.
*G06F 8/65* (2018.01)
*B60R 16/023* (2006.01)
(Continued)

(52) U.S. Cl.
CPC ............ *G06F 8/65* (2013.01); *B60R 16/0239* (2013.01); *B60W 10/24* (2013.01); *B60W 30/1886* (2013.01); *H04L 67/34* (2013.01)

(58) Field of Classification Search
CPC ...... G06F 8/65; B60R 16/0239; B60W 10/24; B60W 30/1886; H04L 67/34;
(Continued)

(56) References Cited

U.S. PATENT DOCUMENTS

2013/0197712 A1   8/2013 Matsuura et al.
2018/0281748 A1*  10/2018 Murase .................. G06F 21/51
2018/0310173 A1*  10/2018 Yonemura ........... H04W 12/041

FOREIGN PATENT DOCUMENTS

JP     2012-035662 A     2/2012
JP     2012-035663 A     2/2012
(Continued)

*Primary Examiner* — S. Sough
*Assistant Examiner* — Stephen D Berman
(74) *Attorney, Agent, or Firm* — Oliff PLC

(57) ABSTRACT

A control apparatus includes a switching unit configured to switch a state of a first and a second on-vehicle power supply to a power or a non-power supplying state, an acquisition unit configured to acquire operation information indicating whether the control device is in an operating or non-operating state, and a control unit configured to execute, in a case where a combination of the first and the second power supply is changed from a first to a second pattern, start-up control to determine a state in the second pattern, of an on-vehicle control device suppliable with power from the first power supply, based on the operation information in the first pattern. The first pattern is the first power supply in the power supplying state and the second power supply in the non-power supplying state. The second pattern in the first and second power supplies are in the power supplying state.

9 Claims, 8 Drawing Sheets

(51) Int. Cl.
*B60W 10/24* (2006.01)
*B60W 30/188* (2012.01)
*H04L 67/00* (2022.01)

(58) Field of Classification Search
CPC .... G05D 1/0061; G05D 1/0088; G05D 1/021; G05D 1/0214; G05D 1/0221; G05D 1/0223
See application file for complete search history.

(56) References Cited

FOREIGN PATENT DOCUMENTS

| | | | |
|---|---|---|---|
| JP | 2014-234000 | A | 12/2014 |
| JP | 2015-037938 | A | 2/2015 |
| JP | 2015-179285 | A | 10/2015 |
| JP | 2016-060388 | A | 4/2016 |
| WO | 2012/017719 | A1 | 2/2012 |

* cited by examiner

FIG. 7

POWER SUPPLY MANAGEMENT TABLE TA

| POWER SUPPLY | ECU TO BE STARTED UP | FUNCTION | MANAGEMENT DEVICE | OPERATING STATE |
|---|---|---|---|---|
| +B | GW-1 | RELAY | GW-2 | IN OPERATING |
| +B | GW-2 | RELAY | GW-1 | IN OPERATING |
| +B | RELAY CONTROL ECU | RELAY CONTROL | GW-1 | IN OPERATING |
| +B | BODY CONTROL ECU | BODY CONTROL | GW-1 | IN OPERATING |
| ACC | NAVIGATION CONTROL ECU | AUDIO | GW-2 | IN OPERATING |
| ACC | NAVIGATION CONTROL ECU | MAP | GW-2 | NON-OPERATING |
| ACC | AIR CONDITIONER CONTROL ECU | AIR CONDITIONING | GW-1 | NON-OPERATING |
| IG | AUTOMATIC LIGHTING CONTROL ECU | LIGHT CONTROL | BODY CONTROL ECU | — |
| IG | WIPER CONTROL ECU | WIPER CONTROL | BODY CONTROL ECU | — |

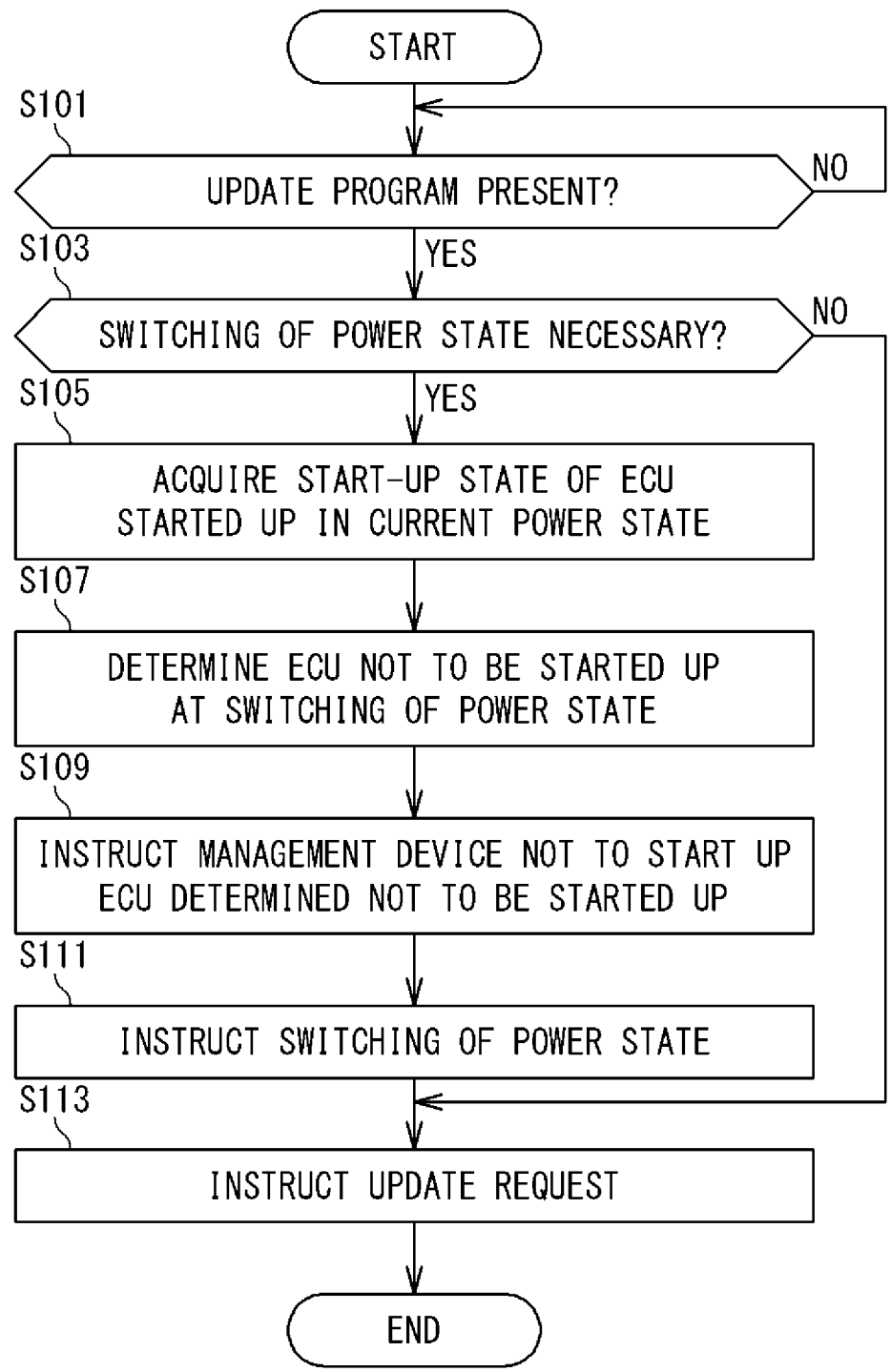

CONTROL APPARATUS, CONTROL METHOD, AND COMPUTER PROGRAM

TECHNICAL FIELD

The present invention relates to a control apparatus, a control method, and a computer program.

This application claims priority on Japanese Patent Application No. 2017-157194 filed on Aug. 16, 2017, the entire contents of which are incorporated herein by reference.

BACKGROUND ART

For example, Patent Literature 1 discloses a technology (online update function) that downloads an update program through a network to update a program.

CITATION LIST

Patent Literature

PATENT LITERATURE 1: Japanese Laid-Open Patent Publication No. 2015-37938

SUMMARY OF INVENTION

According to an embodiment, a control apparatus according to the present disclosure is a control apparatus that communicates with an on-vehicle control device through an in-vehicle communication line, and includes a switching unit configured to switch a state of each of a first on-vehicle power supply and a second on-vehicle power supply to a power supplying state or a non-power supplying state, an acquisition unit configured to acquire operation information indicating whether the on-vehicle control device is in an operating state or in a non-operating state, and a control unit configured to execute, in a case where a combination of the state of the first power supply and the state of the second power supply is changed from a first pattern to a second pattern described below, start-up control to determine a state in the second pattern, of an on-vehicle control device suppliable with power from the first power supply, based on the operation information in the first pattern.

The first pattern is a pattern in which the first power supply is in the power supplying state and the second power supply is in the non-power supplying state.

The second pattern is a pattern in which the first power supply and the second power supply are both in the power supplying state.

According to another embodiment, a control method according to the present disclosure is a control method for controlling an on-vehicle control device by a control apparatus that communicates with the on-vehicle control device through an in-vehicle communication line, and the control method includes the steps of switching a state of each of a first on-vehicle power supply and a second on-vehicle power supply to a power supplying state or a non-power supplying state, acquiring operation information indicating whether the on-vehicle control device is in an operating state or in a non-operating state, and executing, in a case where a combination of the state of the first power supply and the state of the second power supply is changed from a first pattern to a second pattern described below, start-up control to determine a state in the second pattern, of an on-vehicle control device suppliable with power from the first power supply, based on the operation information in the first pattern.

The first pattern is a pattern in which the first power supply is in the power supplying state and the second power supply is in the non-power supplying state.

The second pattern is a pattern in which the first power supply and the second power supply are both in the power supplying state.

According to still another embodiment, a computer program according to the present disclosure is a computer program for causing a computer to function as a control apparatus configured to communicate with an on-vehicle control device through an in-vehicle communication line, and the computer program causes the computer to function as a switching unit configured to switch a state of each of a first on-vehicle power supply and a second on-vehicle power supply to a power supplying state or a non-power supplying state, an acquisition unit configured to acquire operation information indicating whether the on-vehicle control device is in an operating state or in a non-operating state, and a control unit configured to execute, in a case where a combination of the state of the first power supply and the state of the second power supply is changed from a first pattern to a second pattern described below, start-up control to determine a state in the second pattern, of an on-vehicle control device suppliable with power from the first power supply, based on the operation information in the first pattern.

The first pattern is a pattern in which the first power supply is in the power supplying state and the second power supply is in the non-power supplying state.

The second pattern is a pattern in which the first power supply and the second power supply are both in the power supplying state.

BRIEF DESCRIPTION OF DRAWINGS

FIG. 7 is a diagram showing an example of a power supply management table.

FIG. 8 is a flowchart showing a specific example of an update control process in step S4 of FIG. 5.

DESCRIPTION OF EMBODIMENTS

Problems to be Solved by Disclosure

Figure 1:
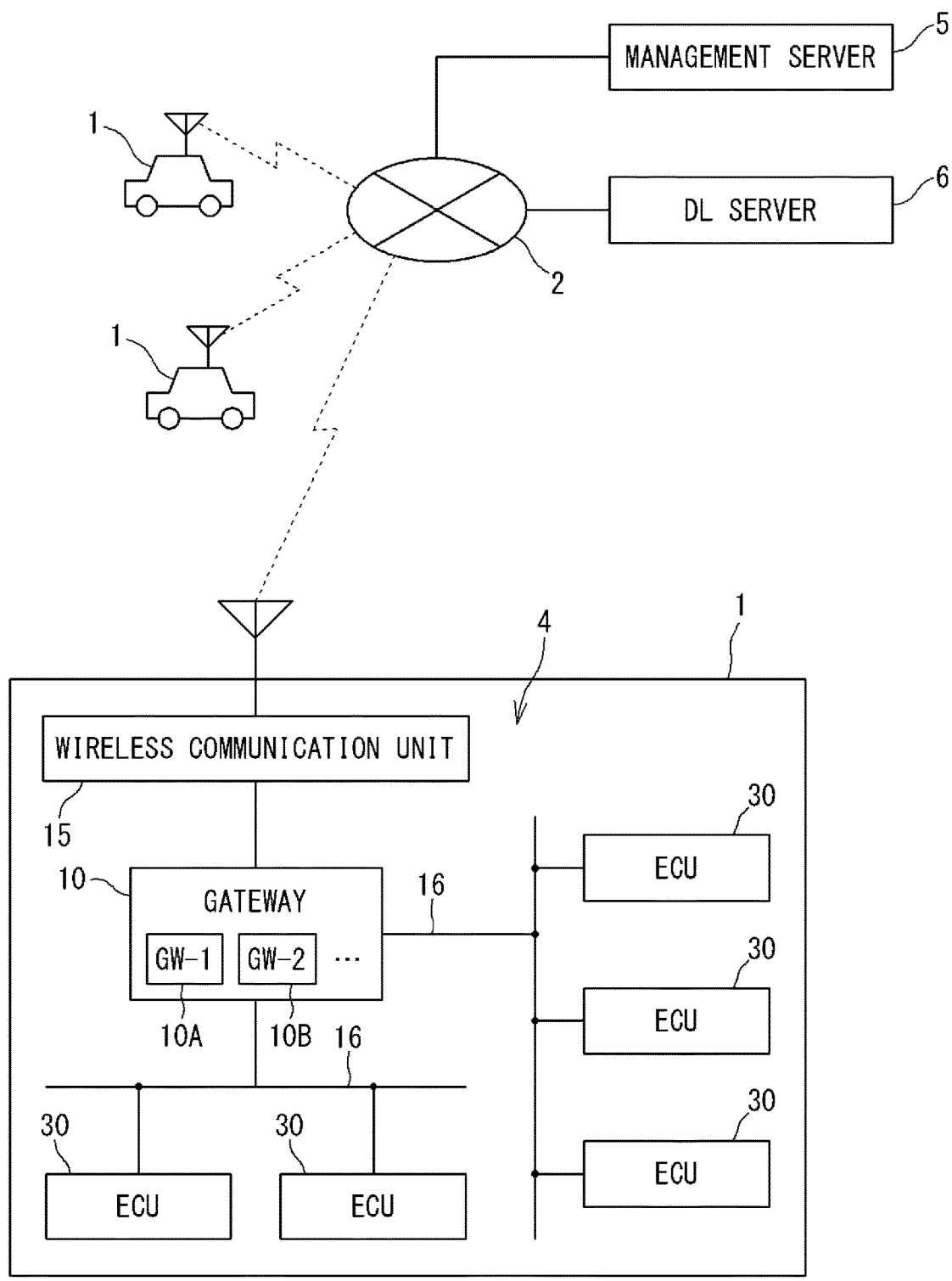
FIG. 1 is a diagram showing an overall configuration of a program update system.

In the automotive field in recent years, vehicles have progressed in functionality, and a diverse range of on-vehicle devices are installed in vehicles. Accordingly, vehicles are equipped with large numbers of control devices, so-called ECUs (Electronic Control Units), for controlling these on-vehicle devices.

There are various types of ECUs such as: traveling-related ECUs that control an engine, a brake, an EPS (Electric Power Steering), etc., in response to operations on an accelerator, a brake, and a handle; body-related ECUs that control ON/OFF of interior lights and headlights, sound of an alarm unit, etc., in response to switch operations performed by an occupant; and meter-related ECUs that control operations of meters arranged near the driver's seat.

Generally, each ECU consists of an arithmetic processing unit such as a microcomputer, and implements control of an on-vehicle device by reading out a control program stored in an ROM (Read Only Memory) and executing the read control program.

Control programs of ECUs may differ depending on the destinations, grades, and the like of vehicles. Therefore, old versions of control programs need to be overwritten with new versions of control programs in response to version upgrading of control programs. Further, data required in executing the control program, such as map information and control parameters need to be overwritten.

The online update function disclosed in Patent Literature 1 is executed at timing when power is not supplied to a device necessary for an update process, for example, during stoppage of engine (in parking), in some cases. In this case, the update process is executed after the power supply to the necessary device is started. In other words, a power state is switched at timing not intended by the user. Therefore, when the power state is switched, a device not intended by the user may be put into an operating state.

An object in an aspect of the present disclosure is to provide a control apparatus, a control method, and a computer program that each can put each of the devices into an appropriate operating state after the power state is switched.

Effects of Disclosure

According to the present disclosure, it is possible to put each of the devices into the appropriate operating state after the power state is switched.

Description of Embodiments

The present embodiment includes at least the following.

(1) A control apparatus included in the present embodiment is a control apparatus configured to communicate with an on-vehicle control device through an in-vehicle communication line, and the control apparatus includes a switching unit configured to switch a state of each of a first on-vehicle power supply and a second on-vehicle power supply to a power supplying state or a non-power supplying state, an acquisition unit configured to acquire operation information indicating whether the on-vehicle control device is in an operating state or in a non-operating state, and a control unit configured to execute, in a case where a combination of the state of the first power supply and the state of the second power supply is changed from a first pattern to a second pattern described below, start-up control to determine a state in the second pattern, of an on-vehicle control device suppliable with power from the first power supply, based on the operation information in the first pattern.

The first pattern is a pattern in which the first power supply is in the power supplying state and the second power supply is in the non-power supplying state.

The second pattern is a pattern in which the first power supply and the second power supply are both in the power supplying state.

The control unit determines the operating state of the on-vehicle control device based on the operation information in the first pattern when the pattern is changed to the second pattern. This makes it possible to put each of the devices into the appropriate operating state after the power state is switched.

(2) Preferably, the start-up control includes control to put the on-vehicle control device that is in the non-operating state in the first pattern, into the non-operating state in the second pattern.

As a result, in the case where the on-vehicle control device is in the non-operating state in the first pattern, the on-vehicle control device is not started up and the state is maintained when the pattern is changed to the second pattern. This makes it possible to put each of the devices into the appropriate operating state after the power state is switched.

(3) Preferably, the control to put the on-vehicle control device into the non-operating state, includes control to interrupt power supply to the on-vehicle control device from the first power supply.

Interrupting the power supply makes it possible to surely put the on-vehicle control device into the non-operating state.

(4) Preferably, the control to put the on-vehicle control device into the non-operating state, includes control to instruct the on-vehicle control device to shift to an operation-stopped state.

The on-vehicle control device shifts to the operation-stopped state in response to the above-described instruction. This makes it possible to put the on-vehicle control device into the non-operating state by simple control.

(5) Preferably, the on-vehicle control device includes a plurality of functions that can individually shift to the operation-stopped state, and the control unit executes the start-up control on each of the functions of the on-vehicle control device.

As a result, in the case of the on-vehicle control device in which each of the functions can shift to the operation-stopped state, each of the functions can be put into the appropriate operating state after the power state is switched.

(6) Preferably, the control unit instructs another on-vehicle control device that controls the on-vehicle control device, to transmit the instruction to shift the state to the operation-stopped state.

As a result, even in a case where a target on-vehicle control device is not directly controlled, the on-vehicle control device can be put into the non-operating state.

(7) Preferably, in a case where the combination of the states of the power supplies is the first pattern when a control program is updated in an on-vehicle control device suppliable with power from the second power supply, the switching unit switches the state of the second power supply to the power supplying state and changes the first pattern to the second pattern.

When the control program is updated, it is necessary to supply power to the on-vehicle control device to be processed, and the power state is switched. Executing the start-up control at this time makes it possible to put each of the on-vehicle control devices other than the on-vehicle control device to be processed, into the appropriate operating state after the power state is switched for update of the control program.

(8) A control method included in the present embodiment is a method for controlling the on-vehicle control devices by the control apparatus according to any one of (1) to (7).

Such a control method achieves effects similar to the effects by the control apparatus according to (1) to (7) described above.

(9) A computer program included in the present embodiment causes a computer to function as the control apparatus according to any one of (1) to (7).

Such a computer program achieves effects similar to the effects by the control apparatus according to (1) to (7) described above.

Detailed Description of Embodiments

Some preferred embodiments are described below with reference to drawings. In the following description, the same parts and components are denoted by the same reference numerals. The same parts and components have the same names and functions. Accordingly, description of the parts and components is not repeated.

First Embodiment

[Overall Configuration of System]

FIG. 1 is a diagram showing an overall configuration of a program update system according to an embodiment of the present invention.

As shown in FIG. 1, the program update system of this embodiment includes vehicles 1, a management server 5, and a DL (download) server 6 that are able to communicate with each other via a wide-area communication network 2.

The management server 5 manages update information on the vehicles 1. The DL server 6 stores an update program. The management server 5 and the DL server 6 are operated by, for example, the automobile manufacturer of the vehicles 1, and are able to communicate with large numbers of vehicles 1 owned by users registered as members in advance.

Each vehicle 1 is equipped with an in-vehicle network (communication network) 4 that includes a plurality of ECUs 30 and a gateway 10 connected via in-vehicle communication lines 16, a wireless communication unit 15, and various kinds of on-vehicle devices (not shown) controlled by the respective ECUs 30.

A plurality of communication groups, each being formed by the plurality of ECUs 30 bus-connected to the common in-vehicle communication lines, are present in the vehicle 1, and the gateway 10 relays communication between the communication groups.

The gateway 10 may include a plurality of gateways, namely, a first gateway (GW-1) 10A and a second gateway (GW-2) 10B. The plurality of gateways 10 may be collectively referred to as the gateway 10.

The wireless communication unit 15 is communicably connected to the wide-area communication network 2 such as a mobile phone network, and is connected to the gateway 10 via an in-vehicle communication line. The gateway 10 transmits information received by the wireless communication unit 15 from external devices such as the management server 5 and the DL server 6 through the wide-area communication network 2, to the ECUs 30 through the in-vehicle communication lines 16.

The gateway 10 transmits information obtained from the ECUs 30 to the wireless communication unit 15, and the wireless communication unit 15 transmits the information to the external devices such as the management server 5.

Further, the ECUs 30 transmit and receive information through the in-vehicle communication lines with one another.

As for the wireless communication unit 15 installed in the vehicle 1, a device possessed by the user, such as a mobile phone, a smart phone, a tablet-type terminal, and a notebook PC (Personal Computer) is conceivable, in addition to an on-vehicle dedicated communication terminal.

FIG. 1 shows an exemplary case where the gateway 10 communicates with the external devices via the wireless communication unit 15. However, if the gateway 10 has a wireless communication function, the gateway 10 itself may wirelessly communicate with the external devices such as the management server 5.

In the program update system shown in FIG. 1, the management server 5 and the DL server 6 are configured as separate servers. However, these serves 5 and 6 may be configured as a single server unit. Further, each of the management server 5 and the DL server 6 may include a plurality of units.

[Internal Configuration of Gateway]

Figure 2:
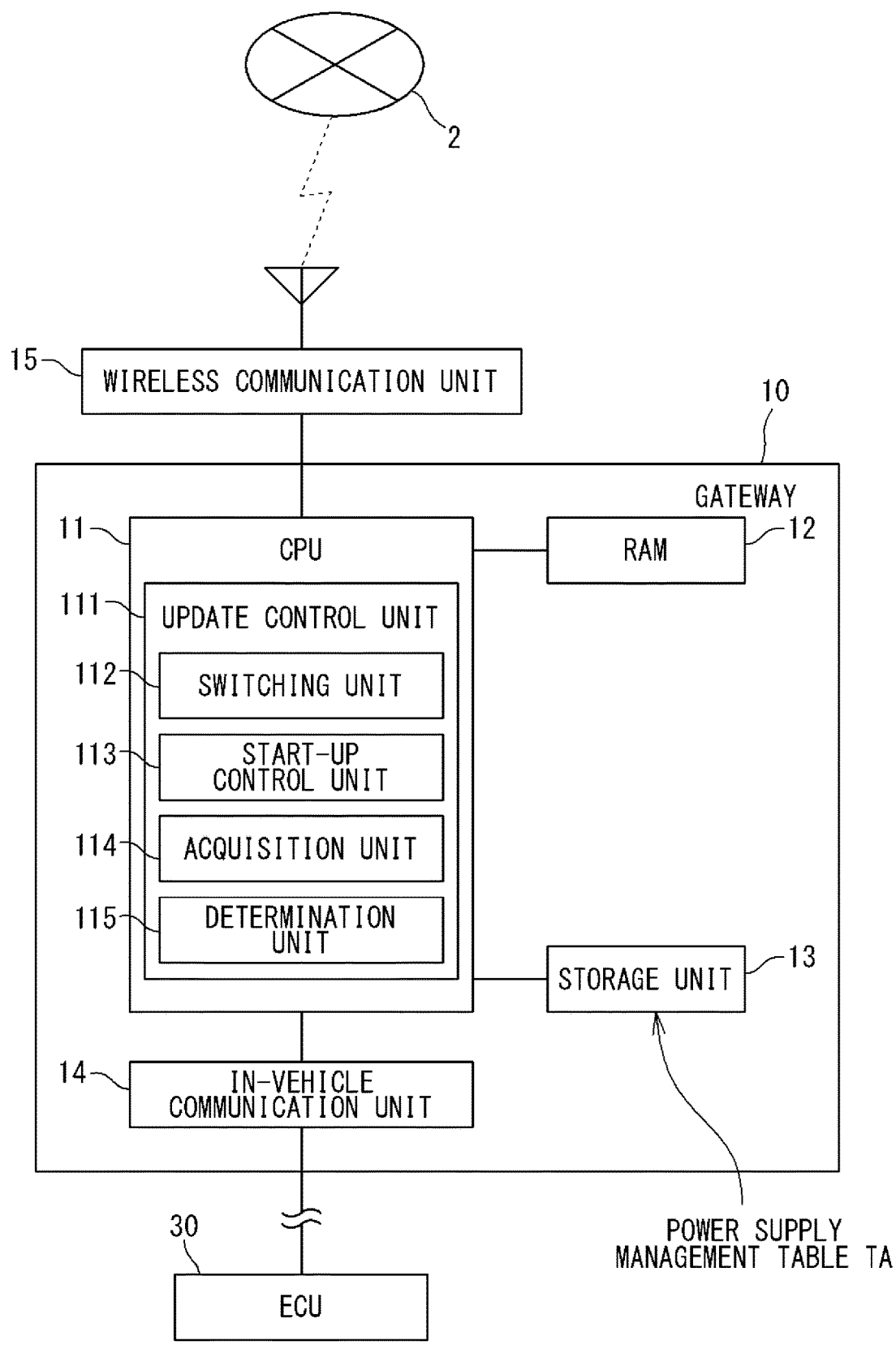
FIG. 2 is a block diagram showing an internal configuration of a gateway.

FIG. 2 is a block diagram showing the internal configuration of the gateway 10.

As shown in FIG. 2, the gateway 10 includes a CPU 11, a RAM (Random Access Memory) 12, a storage unit 13, an in-vehicle communication unit 14, and the like. Although the gateway 10 is connected to the wireless communication unit 15 via the in-vehicle communication line, the gateway 10 and the wireless communication unit 15 may be configured as a single unit.

The CPU 11 causes the gateway 10 to function as a relay device for relaying various kinds of information, by reading out one or a plurality of programs stored in the storage unit 13 to the RAM 12 and executing the read programs.

The CPU 11 can execute a plurality of programs in parallel by switching between the plurality of programs in a time sharing manner, for example. Note that the CPU 11 may be a representative of a plurality of CPU groups. In this case, the function implemented by the CPU 11 is implemented by the plurality of CPU groups in cooperation with one another. The RAM 12 consists of a memory element such as an SRAM (Static RAM) or a DRAM (Dynamic RAM), and temporarily stores therein programs to be executed by the CPU 11, data required in executing the programs, and the like.

A computer program to be executed by the CPU 11 can be transferred in a state of being recorded in a well-known recording medium such as a CD-ROM and a DVD-ROM, or may be transferred by data transmission from a computer device such as a server computer.

In this regard, the same applies to a computer program to be executed by a CPU 31 of the ECU 30 (refer to FIG. 3) described below, and a computer program to be executed by a CPU 51 of the management server 5 (refer to FIG. 4) described below.

Note that, in the following description, data transfer (transmission) from a high-order device to a low-order device is also referred to as "downloading".

The storage unit 13 consists of, for example, a nonvolatile memory element such as a flash memory or an EEPROM. The storage unit 13 stores programs to be executed by the CPU 11, data required in executing the programs, and the like. The storage unit 13 further stores therein update programs of the respective ECUs 30 to be downloaded that are received from the DL server 6.

The plurality of ECUs 30 is connected to the in-vehicle communication unit 14 via the in-vehicle communication lines arranged in the vehicle 1. The in-vehicle communication unit 14 performs communication (also referred to as CAN (Controller Area Network) communication) with the ECUs 30 in accordance with a standard such as CAN. The communication standard adopted by the in-vehicle communication unit 14 is not limited to CAN, and may adopt standard such as CANFD (CAN with Flexible Data Rate), LIN (Local Interconnect Network), Ethernet (registered trademark), or MOST (Media Oriented Systems Transport: MOST is a registered trademark). The plurality of in-vehicle communication lines may include an in-vehicle communication line different in communication standard.

The in-vehicle communication unit 14 transmits information provided from the CPU 11 to target ECUs 30, and provides information received from the ECUs 30 to the CPU 11. The in-vehicle communication unit 14 may communicate with the ECUs 30 in accordance with other communication standards that are used for the in-vehicle network 4, apart from the above communication standards.

The wireless communication unit 15 consists of a wireless communication apparatus including an antenna and a communication circuit that executes transmission/reception of radio signals through the antenna. The wireless communication unit 15 is able to communicate with the external devices when connected to the wide-area communication network 2 such as a mobile phone network.

The wireless communication unit 15 transmits information provided from the CPU 11 to the external devices such as the management server 5 via the wide-area communication network 2 formed by a base station (not shown), and provides information received from the external devices to the CPU 11.

Instead of the wireless communication unit 15 shown in FIG. 2, a wired communication unit that serves as a relay device inside the vehicle 1 may be adopted. The wired communication unit has a connector to which a communication cable conforming to a standard such as USB (Universal Serial Bus) or RS232C is connected, and performs wired communication with another communication device connected thereto via the communication cable.

If the other communication device and the external device such as the management server 5 can wirelessly communicate with each other via the wide-area communication network 2, the external device and the gateway 10 are able to communicate with each other through a communication path consisting of the external device, the other communication device, the wired communication unit, and the gateway 10, in this order.

[Internal Configuration of ECU]

Figure 3:
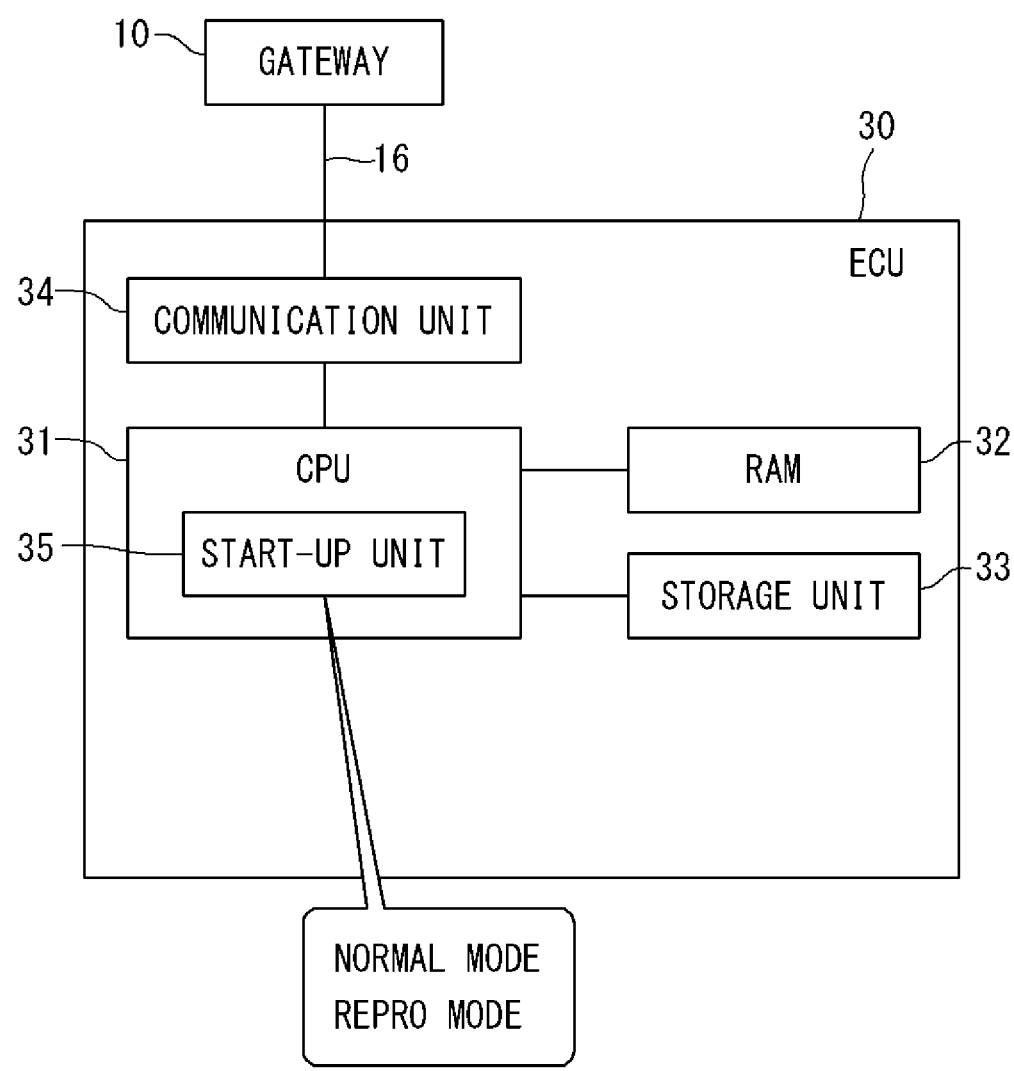
FIG. 3 is a block diagram showing an internal configuration of an ECU.

FIG. 3 is a block diagram showing the internal configuration of an ECU 30.

As shown in FIG. 3, the ECU 30 includes the CPU 31, a RAM 32, a storage unit 33, a communication unit 34, and the like. The ECU 30 is an on-vehicle control device that individually controls a target device installed in the vehicle 1. Examples of the types of the ECU 30 include a power-supply control ECU, an engine control ECU, a steering control ECU, and a door lock control ECU.

The CPU 31 controls the operation of a target device that the CPU 31 is in charge of, by reading out one or a plurality of programs previously stored in the storage unit 33 to the RAM 32 and executing the read programs. The CPU 31 may also be a representative of a plurality of CPU groups, and the control by the CPU 31 may be control by the plurality of CPU groups in cooperation with one another.

The RAM 32 consists of a memory element such as an SRAM or a DRAM, and temporarily stores therein programs to be executed by the CPU 31, data required in executing the programs, and the like.

The storage unit 33 consists of, for example, a nonvolatile memory element such as a flash memory or an EEPROM, or a magnetic storage device such as a hard disk.

The storage unit 33 stores programs to be read and executed by the CPU 31. Information stored in the storage unit 33 includes, for example, a computer program that causes the CPU 31 to execute information processing for controlling a target device to be controlled, inside the vehicle, and a control program that is data to be used to execute the program, such as parameters and map information.

The gateway 10 is connected to the communication unit 34 via the in-vehicle communication line arranged in the vehicle 1. The communication unit 34 communicates with the gateway 10 in accordance with a standard such as CAN, Ethernet, or MOST.

The communication unit 34 transmits information provided from the CPU 31 to the gateway 10, and provides information received from the gateway 10 to the CPU 31. The communication unit 34 may communicate with the gateway 10 in accordance with other communication standards that are used for the on-vehicle network, apart from the above communication standards.

The CPU 31 of the ECU 30 includes a start-up unit 35 that switches the mode of control performed by the CPU 31, between a "normal mode" and a "reprogramming mode" (hereinafter also referred to as "repro mode").

The normal mode is a control mode in which the CPU 31 of the ECU 30 executes original control for the target device (e.g., engine control for fuel engine, or door lock control for door lock motor).

The reprogramming mode is a control mode in which the CPU 31 updates the control program used for controlling the target device.

In other words, the reprogramming mode is a control mode in which the CPU 31 performs erasing/overwriting of the data of the control program from/on an ROM area in the storage unit 33. Only when the CPU 31 is in this control mode, the CPU 31 is allowed to update the control program stored in the ROM area in the storage unit 33 to a new version of the control program.

When the CPU 31, in the repro mode, writes the new version of the control program into the storage unit 33, the start-up unit 35 temporarily restarts (resets) the ECU 30, and executes a verifying process on the storage area where the new version of the control program has been written.

After completion of the verifying process, the start-up unit 35 operates the CPU 31 with the updated control program.

Update of the control program with use of an update program downloaded from the DL server 6 to the ECU 30 through the gateway 10, is also referred to as online update.

[Internal Configuration of Management Server]

Figure 4:
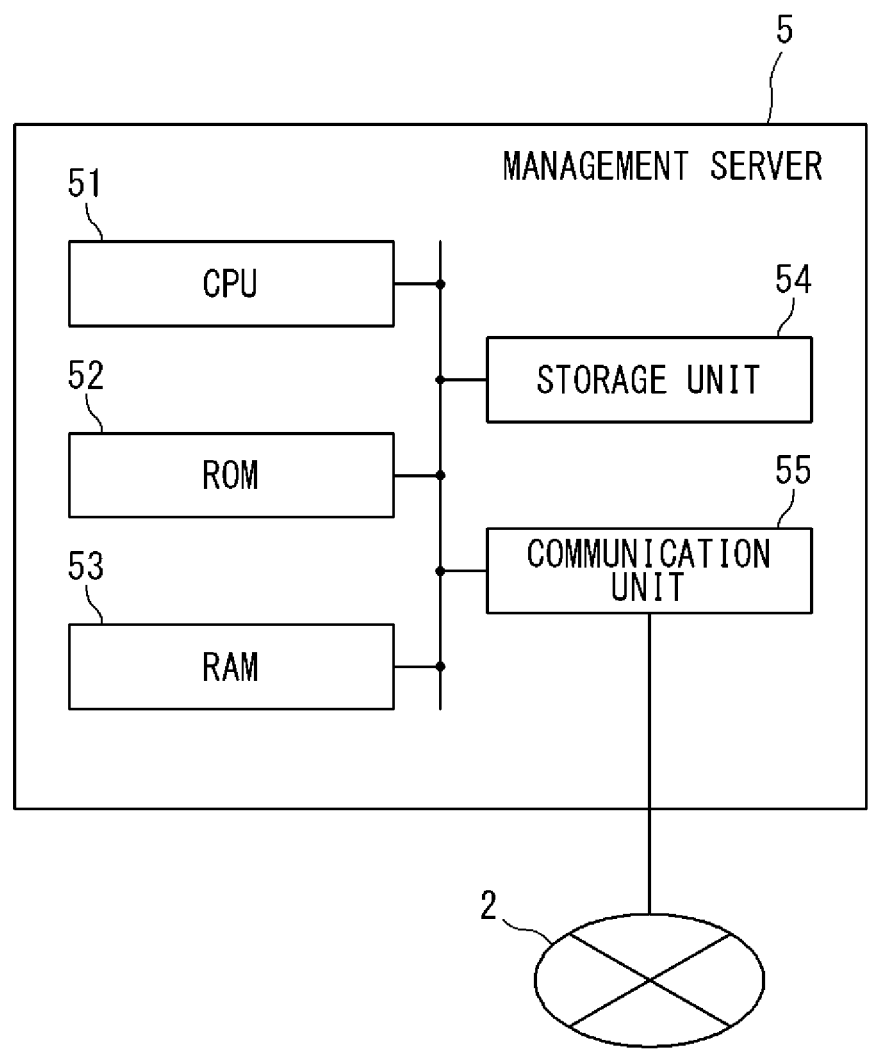
FIG. 4 is a block diagram showing an internal configuration of a management server.

FIG. 4 is a block diagram showing the internal configuration of the management server 5.

As shown in FIG. 4, the management server 5 includes the CPU 51, a ROM 52, a RAM 53, a storage unit 54, a communication unit 55, and the like.

By reading out one or a plurality of programs previously stored in the ROM 52 to the RAM 53 and executing the read programs, the CPU 51 controls the operation of each hardware component, and causes the management server 5 to function as an external device that is able to communicate with the gateway 10. The CPU 51 may also be a representative of a plurality of CPU groups, and the function implemented by the CPU 51 may be implemented by the plurality of CPU groups in cooperation with one another.

The RAM 53 consists of a memory element such as an SRAM or a DRAM, and temporarily stores therein programs to be executed by the CPU 51, data required in executing the programs, and the like.

The storage unit 54 consists of, for example, a nonvolatile memory element such as a flash memory or an EEPROM, or a magnetic storage device such as a hard disk.

The communication unit 55 consists of a communication device that executes a communication process in accordance with a predetermined communication standard. The communication unit 55 executes the communication process when connected to the wide-area communication network 2 such as a mobile phone network. The communication unit 55 transmits information provided from the CPU 51 to external devices via the wide-area communication network 2, and provides information received via the wide-area communication network 2 to the CPU 51.

[Control Program Update Sequence]

Figure 5:
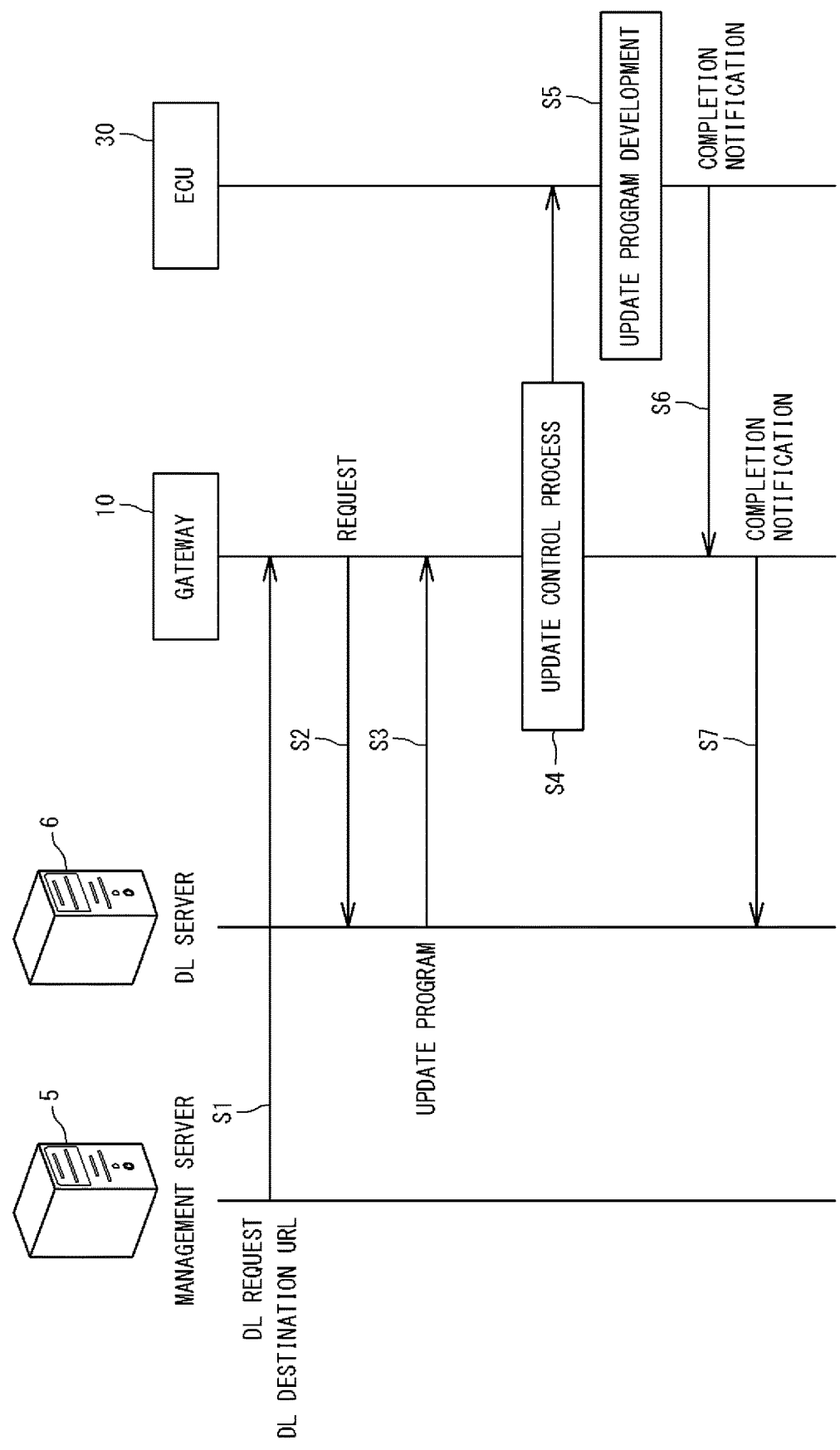
FIG. 5 is a sequence diagram showing an example of flow of online update of a control program, executed by the program update system.

FIG. 5 is a sequence diagram showing an example of flow of control program online update executed in the program update system of the present embodiment. One or a plurality of update programs is stored in the DL server 6. As an example, the management server 5 determines timing when the control programs for the ECUs of a previously-registered vehicle 1 are updated. The update timing may be set by, for example, the automobile manufacturer of the vehicle 1.

The control program includes not only the program itself but also data used in execution of the program, such as the parameters and the map information. The representative thereof is represented as the "control program". Accordingly, the update program includes not only the program for updating the program but also data for updating the data used in execution of the program.

When the control program update timing arrives, the management server 5 notifies the gateway 10 of the corresponding vehicle 1 of update (step S1). In step S1, a download request and update information including destination URL where the update program is stored and a size of the update program are transmitted from the management server 5 to the gateway 10.

Upon receiving the update notification from the management server 5, the gateway 10 relays the update program downloaded from the DL server 6, to the ECU 30 (hereinafter, target ECU) in which the control program is updated. In other words, the gateway 10 requests download of the update program to the DL server 6 based on the update information (step S2).

Upon receiving the download request from the gateway 10, the DL server 6 transmits the update program to be downloaded to the gateway 10, and requests update of the control program (step S3).

Upon downloading the update program, the gateway 10 executes an update control process (step S4). The update control process includes a switching process, an acquisition process, a determination process, a start-up control process, and an update request process described below.

Switching process: a process to switch the state of each of the power supplies to a power suppliable state/non-power supplying state so as to supply power to a device necessary for an update process Acquisition process: a process to acquire operation information indicating whether the ECU suppliable with power from the power supply in the power supplying state is in an operating state or in a non-operating state Determination process: a process to determine, based on the operation information, the ECU to be put into the non-operating state when the state of the power supply is switched Start-up control process: a process to put the determined ECU into the non-operating state Update request process: a process to pass the update program to the target ECU and to request the target ECU to update the control program Note that the operation information is information indicating whether the ECU is in the operating state or the non-operating state described below.

Operating state: a state where the ECU is supplied with power and is operating Non-operating state: any of a state where the ECU is not supplied with power, a state where the ECU is supplied with power but is not started up, and a state where the ECU is supplied with power and is started up but is not operating.

Upon receiving a control signal based on the update control process together with the update program from the gateway 10, the target ECU develops the update program based on the control signal, and updates the control program (step S5).

Upon completing update of the control program, the target ECU 30 notifies the gateway 10 of update completion (step S6). Upon receiving the notification, the gateway 10 notifies the DL server 6 of update completion (step S7).

[Configuration of Vehicle]

Figure 6:
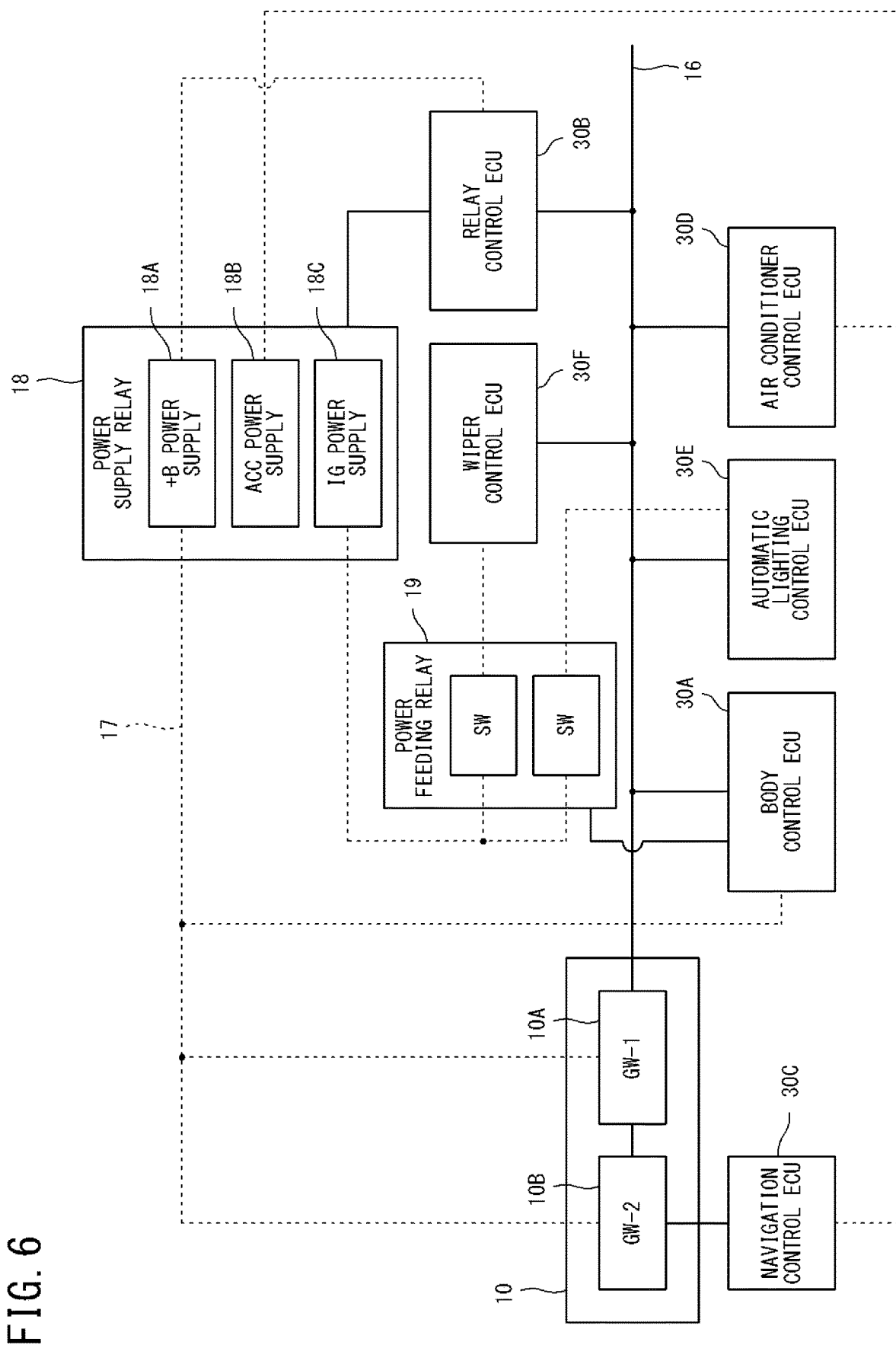
FIG. 6 is a schematic diagram showing an example of a configuration of a vehicle.

FIG. 6 is a schematic diagram showing an example of a configuration of the vehicle 1 including a power supply configuration. In FIG. 6, a dashed line indicates a power line.

As shown in FIG. 6, an on-vehicle power supply of the vehicle 1 includes a regular power supply (+B power supply) 18A, an accessory power supply (ACC power supply) 18B, and an ignition power supply (IG power supply) 18C. The regular power supply 18A is constantly in a power suppliable state (hereinafter, referred to as ON state). Each of the ACC power supply 18B and the IG power supply 18C is switched to a power supplying state/non-power supplying state (hereinafter, referred to as OFF state) in response to ON/OFF of a power supply relay 18. A relay control ECU 30B of the plurality of ECUs 30 controls operation of the power supply relay 18 to control the ON state/OFF state of each of the ACC power supply 18B and the IG power supply 18C.

These power supplies are each switched to the power suppliable state in a stepwise manner. In other words, the IG power supply 18C is switchable from the OFF state to the ON state when the ACC power supply 18B is in the ON state. In a case where the IG power supply 18C is in the ON state at a time when the ACC power supply 18B is switched from the OFF state to the ON state, the IG power supply 18C is also switched to the OFF state.

As a result, in the present embodiment, there are three combinations X, Y, and Z as combinations of the ON state/OFF state of the power supplies 18A to 18C, and these combinations are shifted in order of the combination X, the combination Y, and the combination Z in response to switching of the ON state/OFF state of each of the power supplies. Note that, in the following description, the combination of the ON state/OFF state of the power supplies 18A to 18C is also referred to as a power state.

Combination X: a combination of the regular power supply 18A in the ON state and the ACC power supply 18B and the IG power supply 18C in the OFF state Combination Y: a combination of the regular power supply 18A and the ACC power supply 18B in the ON state and the IG power supply 18C in the OFF state Combination Z: a combination of the regular power supply 18A, the ACC power supply 18B, and the IG power supply 18C in the ON state The regular power supply 18A is connected to the gateway 10, the relay control ECU 30B, and a body control ECU 30A through power lines 17, and constantly supplies power to the gateway 10, the relay control ECU 30B, and the body control ECU 30A.

The ACC power supply 18B is connected to a navigation control ECU 30C that controls a navigation device (not shown) and an air conditioner control ECU 30D that controls an air conditioner (not shown), through the power lines 17. In the ON state, the ACC power supply 18B can supply power to the navigation control ECU 30C and the air conditioner control ECU 30D.

The IG power supply 18C is connected to an automatic lighting control ECU 30E that controls automatic lighting/extinction of a light (not shown) and a wiper control ECU 30F that controls operation of a wiper (not shown), through the power lines 17. In the ON state, the IG power supply 18C can supply power to the automatic lighting control ECU 30E and the wiper control ECU 30F.

A power feeding relay 19 is provided on the power line 17 between the IG power supply 18C and the automatic lighting control ECU 30E and on the power line 17 between the IG power supply 18C and the wiper control ECU 30F. The power feeding relay 19 can individually switch the automatic lighting control ECU 30E and the wiper control ECU 30F to an energized state/interrupted state with respect to the IG power supply 18C. The body control ECU 30A controls operation of the power feeding relay 19 to individually switch the automatic lighting control ECU 30E and the wiper control ECU 30F to the operating state/non-operating state.

[Functional Configuration of Gateway]

As shown in FIG. 2, the CPU 11 of the gateway 10 includes an update control unit 111 as a function to execute the update control process. The update control unit 111 includes a switching unit 112 executing the switching process, a start-up control unit 113 executing the start-up control process, an acquisition unit 114 executing the acquisition process, and a determination unit 115 executing the determination process.

To execute the acquisition process by the acquisition unit 114, the storage unit 13 stores, for example, in a power supply management table TA, the ECU that can be started up by power supply from each of the power supplies and a management device that manages the power supply to the ECU. The power supply management table TA may be previously stored in the storage unit 13 or may be acquired from the management server 5 or the like and stored in the storage unit 13.

FIG. 7 is a diagram showing an example of the power supply management table TA, and showing an example of the power supply management table TA in the vehicle 1 exemplified in FIG. 6. As shown in FIG. 7, in a case where only the regular power supply 18A is in the ON state (combination X), the power is supplied to the gateways 10A and 10B, the relay control ECU 30B, and the body control ECU 30A. The management device of the gateway 10A is the gateway 10B, and the management device of each of the gateway 10B, the relay control ECU 30B, and the body control ECU 30A is the gateway 10A.

In a case where the ACC power supply 18B is in the ON state in addition to the regular power supply 18A (combination Y), the power can be further supplied to the navigation control ECU 30C and the air conditioner control ECU 30D. The management device of the navigation control ECU 30C is the gateway 10B, and the management device of the air conditioner control ECU 30D is the gateway 10A.

In a case where the ACC power supply 18B and the IG power supply 18C are in the ON state in addition to the regular power supply 18A (combination Z), the power can be further supplied to the automatic lighting control ECU 30E and the wiper control ECU 30F. When the power is supplied, these ECUs are started up. The management device of each of these ECUs is the body control ECU 30A.

The acquisition unit 114 acquires the operation information on each of the ECUs by monitoring a frame transmitted from each of the ECUs. As an example, the acquisition unit 114 writes the operation information on each of the ECUs in the power supply management table TA. In the example of FIG. 7, the operating state of each of the ECUs is shown as "in operating", and the non-operating state is shown as "non-operating".

When the ON state/OFF state of each of the power supplies is switched, the determination unit 115 determines an ECU to be put into the non-operating state after the switching, based on the operation information before the switching, among the ECUs suppliable with power from the power supply that is in the ON state both before and after the switching. In the following description, a power state before the switching of the power supplies is also referred to as a first power state, and a power state after the switching is also referred to as a second power state.

The operation of each of the units is specifically described in the case where the power state is changed from the combination Y (first pattern) to the combination Z (second pattern) as a specific example. The acquisition unit 114 at least acquires the operation information on the ECUs (hereinafter, also referred to as common ECUs) suppliable with power from the power supplies (regular power supply 18A and the ACC power supply 18B) that can supply power in both of the first and second patterns. The acquisition unit 114 may acquire the operation information on all of the ECUs suppliable with power in the first pattern. The common ECUs include the gateways 10A and 10B, the relay control ECU 30B, the body control ECU 30A, the navigation control ECU 30C, and the air conditioner control ECU 30D.

When the power state is the first pattern, the air conditioner control ECU 30D is in the non-operating state, and the gateways 10A and 10B, the relay control ECU 30B, and the body control ECU 30A are in the operating state. In this case, "in operating" is written as the operation information on each of the gateways 10A and 10B, the relay control ECU 30B, and the body control ECU 30A, and "non-operating" is written as the operation information on the air conditioner control ECU 30D, in the power supply management table TA in FIG. 7.

When the IG power supply 18C is switched to the ON state and the power state is changed to the second pattern, the determination unit 115 determines the ECU to be put into the non-operating state among the common ECUs, based on the operation information written in the power supply management table TA in FIG. 7. In other words, the determination unit 115 determines that the ECU in the non-operating state in the first pattern is still in the non-operating state after the power state is changed to the second pattern, and the other ECUs are put into the operating state, among the above-described common ECUs. In this example, the determination unit 115 determines that the air conditioner control ECU 30D is put into the non-operating state.

Preferably, in addition to the above-described ECUs, the determination unit 115 determines that, among the ECUs suppliable with power from the IG power supply 18C that is newly switched to the ON state in the second pattern, the ECUs other than the update target ECU are put into the non-operating state after the power state is changed to the second pattern. In this example, the determination unit 115 determines that the automatic lighting control ECU 30E and the wiper control ECU 30F are put into the non-operating state.

The start-up control unit 113 executes the start-up control to put the ECUs that have been determined to be put into the non-operating state by the determination unit 115, into the non-operating state. In other words, the start-up control unit 113 instructs the management devices of the respective ECUs that have been determined to be put into the non-operating state by the determination unit 115, to put the respective ECUs into the non-operating state. More specifically, the start-up control unit 113 generates a frame that includes data instructing interruption of power supply, and causes the in-vehicle communication unit 14 to transmit the frame to the management devices.

In the above-described example, the start-up control unit 113 instructs the body control ECU 30A to interrupt the power supply to the automatic lighting control ECU 30E and the wiper control ECU 30F. Upon receiving the frame including the above-described instruction from the gateway 10A, the body control ECU 30A controls the power feeding relay 19 based on the instruction, and turns off a switch provided on the power line 17 between the IG power supply 18C and the automatic lighting control ECU 30E and a switch provided on the power line 17 between the IG power supply 18C and the wiper control ECU 30F. Thus, the power supply from the IG power supply 18C to these ECUs is interrupted. As a result, the automatic lighting control ECU 30E and the wiper control ECU 30F are put into the non-operating state.

The switching unit 112 switches the ON state/OFF state of each of the power supplies. To switch the ON state/OFF state, the switching unit 112 instructs the relay control ECU 30B to switch each of the power supplies to the ON state or the OFF state. More specifically, the switching unit 112 generates a frame that includes data instructing switching of each of the power supplies to the ON state or the OFF state, and causes the in-vehicle communication unit 14 to transmit the frame to the relay control ECU 30B. In the above-described example, the switching unit 112 instructs the relay control ECU 30B to switch the IG power supply 18C to the ON state.

Note that the process order of the switching process by the switching unit 112 and the start-up control process by the start-up control unit 113 is not limited to a specific order. Preferably, the switching process is executed after the start-up control process is executed. This makes it possible to avoid the ECU determined to be put into the non-operating state from being started up after the power state is changed.

After the start-up control process and the switching process, the update control unit 111 transmits the update program to the target ECU, and requests the target ECU to update the control program. More specifically, the update control unit 111 causes the in-vehicle communication unit 14 to transmit the update program to the target ECU. In addition, the update control unit 111 generates a frame that includes data instructing update of the control program, and causes the in-vehicle communication unit 14 to transmit the frame to the target ECU.

[Operation Flow]

FIG. 8 is a flowchart showing a specific example of the update control process in step S4 of FIG. 5. The process shown in the flowchart of FIG. 8 is executed when the CPU 11 of the gateway 10 reads out one or a plurality of programs stored in the storage unit 13 to the RAM 12, and executes the read programs to achieve the functions shown in FIG. 2. The process in FIG. 8 is executed when an unprocessed update program downloaded from the DL server 6 is stored in the storage unit 13 of the gateway 10.

As shown in FIG. 8, in a case where the unprocessed update program is stored in the storage unit 13 (YES in step S101), the CPU 11 executes the following operation. In a case where it is necessary to switch the current ON state/OFF state of each of the power supplies for the update process (YES in step S103), namely, in a case where power is not supplied from the power supply currently in the ON state to the ECU necessary for the update process, the CPU 11 executes processes in steps S105 to S111. In a case where it is unnecessary to switch the ON state/OFF state of each of the power supplies (NO in step S103), the processes in steps S105 to S111 are skipped, and the update control process in step S113 is executed.

More specifically, in the case where it is necessary to switch the ON state/OFF state of each of the power supplies, the CPU 11 monitors the frame from each of the common ECUs to acquire the operation information (step S105). The CPU 11 then determines the ECU to be put into the non-operating state among the common ECUs, based on the operation information (step S107). In step S107, the CPU 11 determines that the ECU in the non-operating state before the switching among the common ECUs is put into the non-operating state, and determines that, among the ECUs suppliable with power from the power supply that is newly switched to the ON state, the ECUs other than the target ECU are also put into the non-operating state. Further, the CPU 11 instructs the management devices of the respective ECUs that have been determined to be put into the non-operating state, to put the respective ECUs into the non-operating state (step S109). In the first embodiment, in step S109, the CPU 11 instructs interruption of the power supply to the ECUs.

After the start-up control process, the CPU 11 executes the switching process in step S111 and the update control process in step S113. In other words, the CPU 11 causes the in-vehicle communication unit 14 to transmit switching instruction of the ON state/OFF state to the relay control ECU 30B (step S111). In addition, the CPU 11 causes the in-vehicle communication unit 14 to transmit the update program and the update request for the control program, to the target ECU (step S113).

[Effects of First Embodiment]

In the program update system according to the first embodiment, in the case where the pattern of the combination of the power state is changed as a result of switching of the ON state/off state of each of the power supplies for update of the control program, the operating state/non-operating state of each of the ECUs suppliable with power from the power supply that is in the ON state both before and after the change of the pattern is maintained to the state before the change of the pattern. In other words, the ECU not intended by the user does not start operation in response to start of the update of the control program. This makes it possible to prevent, for example, the function not intended by the user such as a wiper from staring operation at the update timing. In other words, this makes it possible to maintain the appropriate operating state of each of the ECUs.

Second Embodiment

In the first embodiment, each of the ECUs provided with the power feeding relay 19 that can individually switch the ECUs to the energized state/interrupted state with respect to the power supply is put into the non-operating state by interrupting the power supply to each of the ECUs by the power feeding relay 19. This makes it possible to surely put the ECUs into the non-operating state.

The control to put the ECUs that have been determined to be put into the non-operating state, into the non-operating state is not limited only to the control to interrupt the power supply to the ECU. Start-up control in a program update system according to a second embodiment includes control to shift the ECU into an operation-stopped state. Note that the operation-stopped state indicates a state other than a fully-operating state, and includes, for example, a low-power consumption state where power is supplied to a processor, a low-power consumption state where the power supply to the processor and the memory is interrupted, and a stand-by state.

In this case, the start-up control unit 113 instructs the management devices of the respective ECUs to be put into the non-operating state, to put the respective ECUs into the operation-stopped state. More specifically, the start-up control unit 113 generates a frame that includes data instructing the operation-stopped state, and causes the in-vehicle communication unit 14 to transmit the frame to the management devices. In other words, in the program update system according to the second embodiment, in step S109 of FIG. 8, the CPU 11 instructs the management devices to put the respective ECUs into the operation-stopped state.

In the above-described example, since the air conditioner control ECU 30D, the management device of which is the gateway 10A, is determined to be put into the non-operating state, the start-up control unit 113 transmits the frame that includes the data instructing the operation-stopped state, to the air conditioner control ECU 30D. As a result, the air conditioner control ECU 30D is put into the non-operating state where the air conditioner control ECU 30D is supplied with power from the ACC power supply 18D but is in the operation-stopped state.

As a result, the ECU can be easily put into the non-operating state as compared with the case where the power feeding relay 19 is used.

<Modification 1>

Note that the start-up control in the first embodiment and the start-up control in the second embodiment may be combined. In other words, the start-up control unit 113 may put the ECU provided with the power feeding relay 19 into the non-operating state by interrupting the power supply to the ECU, and may put the ECU not provided with the power feeding relay 19, into the non-operating state by instructing the operation-stopped state.

As a result, even in a case where the ECU provided with the power feeding relay 19 and the ECU not provided with the power feeding relay 19 coexist in the in-vehicle network 4, it is possible to surely put the ECU that has been determined to be put into the non-operating state, into the non-operating state.

<Modification 2>

In a case where the start-up control instructs the operation-stopped state to the ECU to be put into the non-operating state and the ECU includes a plurality of functions that can individually shift to the operation-stopped state, the non-operating state/operating state may be controlled for each of the functions of the ECU. For example, as shown in FIG. 7, in the navigation control ECU 30C, operation stop of an audio output (sound output) function and operation stop of a mechanism relating to a map display (image display) function may be individually managed.

In this case, the start-up control unit 113 designates the function to be put into the operation-stopped state of the ECU to be put into the non-operating state, then generates a frame instructing the function to be put into the operation-stopped state, and causes the in-vehicle communication unit 14 to transmit the frame to the management device of the ECU. In the above-described example, the start-up control unit 113 instructs the gateway 10B that is the management device of the navigation control ECU 30C, to stop operation of the map display (image display) function.

Upon receiving the frame including the above-described instruction from the gateway 10A, the gateway 10B transmits, to the navigation control ECU 30C, a frame that instructs shifting of the map display (image display) function to the operation-stopped state. As a result, the navigation control ECU 30C is put into the non-operating state where the navigation control ECU 30C is supplied with power from the ACC power supply 18B but the map display (image display) function is in the operation-stopped state. In contrast, the audio output (sound output) function is in the operating state.

As a result, the ECU is more flexibly put into the non-operating state.

<Modification 3>

Note that, in the above-described description, the start-up control is executed based on the change of the power state when the update process for the control program is executed in the target ECU. The process executed by the target ECU, however, is not limited to the update process. Even in a case where the target ECU executes the other process, the start-up control may be executed when the power state is changed for the process in a similar manner.

The disclosed features are achieved by one or more modules. For example, the features can be achieved by a circuit element and other hardware module, by a software module specifying process achieving the features, or by a combination of the hardware module and the software module.

A program as a combination of one or more software modules to cause a computer to execute the above-described operation can also be provided. Such a program can be recorded in a computer-readable recording medium such as a flexible disk, a CD-ROM (Compact Disk-Read Only Memory), a ROM, a RAM, and a memory card attached to a computer, and provided as a program product. Alternatively, the program can be provided by being recorded in a recording medium such as a hard disk incorporated in the computer. Furthermore, the program can be provided by download through a network.

Note that the program according to the present disclosure may call a necessary module from program modules provided as a part of the operating system (OS) of the computer, at a predetermined sequence at predetermined timing, to execute processing. In this case, the program itself does not include the above-described module, and the processing is executed in cooperation with the OS. Such a program not including the module may also be included in the program according to the present disclosure.

The program according to the present disclosure may be provided by being incorporated in a part of the other program. Also in this case, the program itself does not include a module included in the above-described other program, and the processing is executed in cooperation with the other program. Such a program incorporated in the other program may also be included in the program according to the present disclosure. The provided program product is installed in a program storage unit such as a hard disk and is then executed. Note that the program product includes a program itself and a recording medium storing the program.

The embodiments disclosed herein are merely illustrative in all aspects and should not be recognized as being restrictive. The scope of the present invention is defined not by the above description but by the scope of the claims, and is intended to include meaning equivalent to the scope of the claims and all modifications within the scope.

REFERENCE SIGNS LIST 1 vehicle
2 wide-area communication network
4 in-vehicle network
5 management server
6 DL server
10, 10A, 10B gateway
11 CPU
12 RAM
13 storage unit
14 in-vehicle communication unit (communication unit)
15 wireless communication unit
16 in-vehicle communication line
17 power line
18 power supply relay
18A regular power supply
18B ACC power supply
18C IG power supply
19 power feeding relay
30 ECU
30A body control ECU
30B relay control ECU
30C navigation control ECU
30D air conditioner control ECU
30E automatic lighting control ECU
30F wiper control ECU
31 CPU
32 RAM
33 storage unit
34 communication unit
35 start-up unit
51 CPU
52 ROM
53 RAM
54 storage unit
55 communication unit
111 update control unit
112 switching unit
113 start-up control unit (control unit)
114 acquisition unit
115 determination unit (control unit)

The invention claimed is:

1. A control apparatus configured to communicate with a plurality of on-vehicle control devices through an in-vehicle communication line, the control apparatus comprising:

a switching unit configured to switch a state of each of a first on-vehicle power supply and a second on-vehicle power supply to a power supplying state or a non-power supplying state;
an acquisition unit configured to acquire operation information indicating whether each of the on-vehicle control devices is in an operating state or in a non-operating state; and
a control unit configured to execute, in a case where a combination of the state of the first power supply and the state of the second power supply is changed from a first pattern to a second pattern, start-up control to determine a state in the second pattern, of a first on-vehicle control device, of the plurality of on-vehicle control devices, suppliable with power from the first power supply, based on the operation information; wherein
the first pattern is a pattern in which the first power supply is in the power supplying state and the second power supply is in the non-power supplying state,
the second pattern is a pattern in which the first power supply and the second power supply are both in the power supplying state, and
in the start-up control, when the switching unit switches from the first pattern to the second pattern, the control unit maintains the non-operating state of the first on-vehicle control device suppliable with power from the first power supply such that the first on-vehicle control device remains in the non-operating state in the second pattern.

2. The control apparatus according to claim 1, wherein the control unit maintains the non-operating state of the first on-vehicle control device by interrupting power supply to the first on-vehicle control device from the first power supply.

3. The control apparatus according to claim 1, wherein the control unit maintains the non-operating state of the first on-vehicle control device by instructing the first on-vehicle control device to shift to an operation-stopped state.

4. The control apparatus according to claim 3, wherein
the first on-vehicle control device includes a plurality of functions configured to individually shift to the operation-stopped state, and
the control unit executes the start-up control separately for each of the functions of the first on-vehicle control device such that each of the functions is individually controlled to be in the operating state or the non-operating state.

5. The control apparatus according to claim 3, wherein the control unit instructs another on-vehicle control device that controls the first on-vehicle control device, to transmit an instruction to shift to the operation-stopped state.

6. The control apparatus according to claim 1, wherein, in a case where the combination of the states of the power supplies is the first pattern when a control program is updated in an on-vehicle control device suppliable with power from the second power supply, the switching unit switches the state of the second power supply to the power supplying state and changes the first pattern to the second pattern.

7. The control apparatus according to claim 1, wherein
the first power supply is an accessory ACC power supply, and
the second power supply is an ignition IG power supply.

8. A control method for controlling a plurality of on-vehicle control devices by a control apparatus that communicates with the on-vehicle control devices through an in-vehicle communication line, the control method comprising the steps of:

switching a state of each of a first on-vehicle power supply and a second on-vehicle power supply to a power supplying state or a non-power supplying state;

acquiring operation information indicating whether each of the on-vehicle control devices is in an operating state or in a non-operating state; and wherein a combination of the state of the first power supply and the state of the second power supply is changed from a first pattern to a second pattern, and in response to the combination changing from the first pattern to the second pattern, executing a start-up control to determine a state in the second pattern, of a first on-vehicle control device, of the plurality of on-vehicle control devices, suppliable with power from the first power supply, based on the operation information; wherein the first pattern is a pattern in which the first power supply is in the power supplying state and the second power supply is in the non-power supplying state, the second pattern is a pattern in which the first power supply and the second power supply are both in the power supplying state, and in the start-up control, in response to the combination of the state of the first power supply and the state of the second power supply being switched from the first pattern to the second pattern, the non-operating state of the first on-vehicle control device suppliable with power from the first power supply is maintained such that the first on-vehicle control device remains in the non-operating state in the second pattern.

9. A non-transitory computer readable storage medium storing a computer program for causing a computer to function as a control apparatus configured to communicate with a plurality of on-vehicle control devices through an in-vehicle communication line, the computer program causing the computer to function as:

a switching unit configured to switch a state of each of a first on-vehicle power supply and a second on-vehicle power supply to a power supplying state or a non-power supplying state;

an acquisition unit configured to acquire operation information indicating whether each of the on-vehicle control devices is in an operating state or in a non-operating state; and a control unit configured to execute, in a case where a combination of the state of the first power supply and the state of the second power supply is changed from a first pattern to a second pattern, start-up control to determine a state in the second pattern, of a first on-vehicle control device, of the plurality of on-vehicle control devices, suppliable with power from the first power supply, based on the operation information; wherein the first pattern is a pattern in which the first power supply is in the power supplying state and the second power supply is in the non-power supplying state, the second pattern is a pattern in which the first power supply and the second power supply are both in the power supplying state, and in the start-up control, when the switching unit switches from the first pattern to the second pattern, the control unit maintains the non-operating state of the first on-vehicle control device suppliable with power from the first power supply such that the first on-vehicle control device remains in the non-operating state in the second pattern.

* * * * *